United States Patent [19]

Lyons

[11] 4,148,747

[45] Apr. 10, 1979

[54] ANTIOXIDANT COMPRISING A HYDROXY AROMATIC COMPOUND CONTAINING SULFUR AND AN ORGANIC PHOSPHONATE

[75] Inventor: Bernard J. Lyons, Palo Alto, Calif.

[73] Assignee: Raychem Corporation, Menlo Park, Calif.

[21] Appl. No.: 513,864

[22] Filed: Oct. 10, 1974

Related U.S. Application Data

[63] Continuation-in-part of Ser. No. 405,554, Oct. 11, 1973, abandoned.

[51] Int. Cl.$^2$ .................. C09K 15/32; C08K 5/05; C08K 5/36; C08K 5/16
[52] U.S. Cl. .................. 252/400 A; 204/159.15; 204/159.16; 204/159.17; 204/159.18; 260/45.8 NT; 260/45.7 P; 260/45.7 S; 260/45.9 R; 260/45.95 C; 260/45.8 R; 260/23.7 M; 252/406
[58] Field of Search .................. 260/45.7 P, 45.8 R, 260/45.7 S, 45.95, 23.7 M; 252/400 A

[56] References Cited

U.S. PATENT DOCUMENTS

| | | | |
|---|---|---|---|
| 2,685,581 | 8/1954 | Coover | 260/248 CS |
| 3,255,191 | 6/1966 | Dexter et al. | 260/45.8 NT |
| 3,277,044 | 10/1966 | Weissermel et al. | 260/45.8 R |
| 3,354,117 | 11/1967 | Schmidt et al. | 260/45.95 |
| 3,440,212 | 4/1969 | Tholstrup | 260/45.8 R |
| 3,472,805 | 10/1969 | Marinaccio et al. | 260/45.95 |
| 3,472,813 | 10/1969 | Hecker et al. | 260/45.75 |
| 3,493,538 | 2/1970 | Salyer et al. | 260/45.95 |
| 3,520,952 | 7/1970 | Hecker et al. | 260/878 |
| 3,749,694 | 7/1973 | Cantatore et al. | 260/45.7 P |

FOREIGN PATENT DOCUMENTS

| | | | |
|---|---|---|---|
| 2132303 | 1/1972 | Fed. Rep. of Germany | 260/45.7 PS |
| 1558953 | 1/1969 | France | 260/45.7 P |
| 1164889 | 9/1969 | United Kingdom | 260/45.95 |
| 1350970 | 4/1974 | United Kingdom | 260/45.7 P |

*Primary Examiner*—Murray Tillman
*Assistant Examiner*—Thurman K. Page
*Attorney, Agent, or Firm*—Lyon & Lyon

[57] ABSTRACT

An improved antioxidant composition, especially suitable for irradiated or fire-retardant plastics, comprising a mixture of a hydroxy aromatic compound containing sulfur and organic phosphonate compounds.

16 Claims, No Drawings

ANTIOXIDANT COMPRISING A HYDROXY AROMATIC COMPOUND CONTAINING SULFUR AND AN ORGANIC PHOSPHONATE

This is a continuation-in-part of application Ser. No. 405,554, filed Oct. 11, 1973, now abandoned.

BACKGROUND OF THE INVENTION

This invention generally relates to antioxidant compositions, and more particularly, to compositions especially suited for use with irradiated polyolefins and highly filled plastics, such as fire-retardant plastics.

Olefin polymers are particularly subject to severe deterioration from the oxidative action of air at elevated temperatures. They are also vulnerable to degradation by the action of ionizing radiation when large amounts of such radiation are deposited onto the polymer, e.g., amounts of $5 \times 10^{10}$ ergs per gram and higher. Oxidative deterioration at elevated temperatures, i.e., temperatures above 50° C., is manifested by surface crazing, cracking, and ultimately complete embrittlement.

Since large amounts of antioxidants, in the order of greater than 5%, result in increased cost and decrease in plastic strength, it is desirable to obtain an antioxidant system which will be effective at elevated temperatures over long periods of time in relatively low amounts.

A highly efficient antioxidant system is particularly desirable for irradiated plastics. Often, during irradiation, much of the antioxidant is consumed or rendered incapable of functioning as an antioxidant. It is therefore necessary that an antioxidant system be employed for plastics which are to be irradiated which will be effective and survive radiation when used in small quantities so as to prevent oxidation even after being subjected to irradiation.

Also, it is very desirable to have an antioxidant of high efficiency for highly filled plastics. High amounts of filler are often required in the formulation of fire-retardant plastics. It is necessary to incorporate a large amount of filler into the plastic to provide fire retardant properties. This generally results in a more permeable plastic composition which will more readily undergo oxidative degradation. Additionally, a large quantity of filler results in a decrease in plastic strength, so it is advantageous to have an efficient antioxidant which is effective in small amounts in the order of 5% or less of the plastic composition.

While the use of hydroxy aromatic compounds containing sulfur as an antioxidant is known, the use of phosphonates as an antioxidant has been known only when they contain a hydroxy aromatic compound. I have found that by combining a phosphonate compound with a hydroxy aromatic compound containing sulfur, a more efficient antioxidant system is obtained.

Thus, it is an object of this invention to provide an antioxidant composition suitable for use with various polymers sensitive to oxidation and which is more efficient at elevated temperatures than the antioxidants of the prior art.

It is a further object of this invention to provide an antioxidant composition which is especially suitable for use with irradiated polyolefins.

It is another object of this invention to provide a antioxidant composition particularly suited for use in fire-retardant plastic systems which have a large percentage of filler.

SUMMARY OF THE INVENTION

An antioxidant composition, especially suited for irradiated or fire-retardant plastics, comprising a hydroxy aromatic compound containing sulfur and an organic phosphonate compound. The hydroxy aromatic compound generally comprises phenol, cresol and naphthol groups with the sulfur preferably attached to at least one cyclic unsaturated compound. The cyclic unsaturated compound is a homoaromatic unsaturated ring compound wherein a ring carbon atom is attached to the sulfur.

Suitable phosphonate compounds have the formula

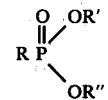

wherein R, R' and R", any two or all three of which may be the same or different, and which may contain further phosphonic moieties, each represents a substituted or unsubstituted alkyl, alkenyl, aryl, alkylaryl or heteroaromatic (e.g., a triazine) radical, or a polymeric radical, or R has the meaning above and R' and/or R" represent a hydrogen atom or are linked together to form a ring.

R' and R" are preferably non-aromatic, e.g., are alkyl and alkenyl groups, especially vinyl and allyl groups, because aromatic substituents have a greater tendency to be hydrolysed.

PREFERRED EMBODIMENT

The present invention provides an antioxidant composition comprising a mixture of (a) a non-metallic hydroxy aromatic compound containing at least one sulfur atom attached to an unsaturated carbocyclic group, and (b) an organic phosphonic acid or a diester or monoester thereof. The present invention also provides a polymer composition comprising one or more polymers which are susceptible to oxidation and an antioxidant composition as defined above.

The present invention is based on the surprising discovery that a blend of compounds (a) and (b) above exhibits better antioxidant properties than either compound used alone at the same total additive level. The antioxidants of the present invention have the further advantage of being very efficient at elevated temperatures.

Certain antioxidant compositions of this invention are particularly useful in plastics which are to be irradiated. The antioxidant composition of this invention has also been found well suited for use in highly filled fire-retardant plastic compositions.

Another surprising advantage exhibited by certain of the antioxidant compositions of the present invention is that they can be employed in small amounts, e.g., amounts of from 1 to 6%, in irradiated plastics compositions especially irradiated cross-linked olefin polymers, without substantially impairing either their antioxidant efficiency or the degree of the cross-linking of the material under irradiation.

Accordingly the present invention further provides a polymer composition comprising at least one irradiated cross-linked polymer and an antioxidant composition comprising (a) a hydroxy aromatic compound containing at least one sulfur atom and (b) an organic phosphonic acid or a diester or monoester thereof.

The hydroxy aromatic compound (a) is preferably non-metallic and the sulfur atom is preferably attached to an unsaturated carbocyclic, e.g., homoaromatic group, such as a phenol, cresol or naphthol group, but the irradiated cross-linked polymer compositions of the present invention may include antioxidant compositions in which compound (a) contains a sulphur atom attached to a carbon atom in a heteronuclear unsaturated ring, e.g., a triazine ring as in 6-(4-hydroxy-3,5-t-butylanilino)2,4-bis(n-octylthio)1,3,5-triazine.

Especially suitable hydroxy aromatic compounds have the formula $R_1—S—R_2$ wherein $R_1$ and $R_2$, which may be the same or different, each representing a substituted or unsubstituted phenol, cresol or naphthol groups. Amongst such compounds there may be mentioned, for example, 4,4'-thiobis(6-t-butyl-m-cresol) or a mixture of oligomers of 4,4'-thiobis(6-t-butyl-m-cresol) as described in British Pat. No. 1,241,582; 1,1'-thiobis(2-naphthol); 2,2'-thiobis(4-methyl-6-t-butyl-phenol); and the reaction product of phosphorus oxychloride and 4,4'-thiobis(6-t-butyl-m-cresol) as described in U.S. Pat. No. 3,354,117.

Diesters of the hereinbefore mentioned organic phosphonic acid are especially preferred and amongst such compounds there may especially be mentioned, for example, diesters of 3-t-butyl-4-hydroxy-5-methyl benzyl phosphonic acid, amyl phosphonic acid, allyl phosphonic acid and α-ethyl-3,5-di-t-butyl-4-hydroxybenzyl phosphonic acid. These include, for example, di-n-octadecyl(3-t-butyl-4-hydroxy-5-methylbenzyl) phosphonate, diallyl allylphosphonate and diamylamylphosphonate. However free phosphonic acids may also be employed.

Other suitable phosphonates are 2,4,6-tris(dialkyl or dialkenyl phosphonato)1,3,5-triazines, e.g., 2,4,6-tris(diallyl phosphonato)-1,3,5-triazine, and the phosphonate of the formula

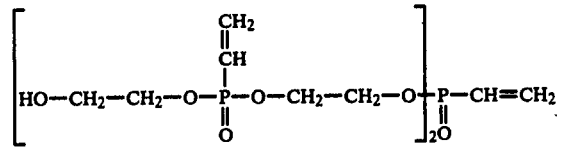

Amongst polymers into which the antioxidant compositions of the present invention may suitably be incorporated there may be mentioned thermoplastic olefin polymers such as polyethylene, polypropylene, ethylene/vinylacetate copolymers, ethylene/acrylic ester copolymers, ethylene/propylene copolymers and ethylene/propylene/diene terpolymers. Antioxidant compositions of the invention are also suitable for use with other polymers which are sensitive to oxidation including polyvinylchloride, polyvinylidenechloride, polyvinylidene fluoride, chlorinated polyethylene, acrylics, saturated and unsaturated olefin elastomers, polyethers and polyesters.

Other phosphorus containing antioxidants useful in polymer systems are found in my copending applications entitled "Antioxidant Comprising a Hydroxy Aromatic Compound Containing Sulfur and an Organic Phosphite," Ser. No. 405,553, now U.S. Pat. No. 3,897,388 and "An Irradiatable Polymer Composition with Improved Oxidation Resistance," Ser. No. 405,521, filed Oct. 11, 1973, now abandoned.

The present invention also provides shaped articles made from the polymer compositions, especially heat-recoverable articles made from the irradiated cross-linked polymers.

It will be appreciated by one skilled in the art that although the most convenient form of antioxidant composition according to the present invention is a mixture of compounds (a) and (b) as defined above a single compound containing both an organic phosphonate radical and a radical containing a hydroxy aromatic group and a sulfur atom could also be expected to be effective.

The following Examples illustrate the invention.

EXAMPLE I

Various mixtures of antioxidants were blended with a high density polyethylene (Marlex 6003, Philips Petroleum Company, density 0.096, M. I. 0.2) on a mill at 160° C. and hydraulically pressed into 6 in by 6 in by 0.020 in slabs at 170° C. and cooled, then irradiated to a dose of 20 Mrads.

To evaluate antioxidant efficiency, ⅛ in strips, 6 inches long were hung in a hot air circulating oven at 175° C. After varying periods of time, samples were withdrawn from the oven, allowed to cool for at least 4 hours to room temperature and then elongated in an Instron Tensile Tester. The initial jaw separation was 1 inch with an elongation rate of 2 in/minute. Jaw separation at rupture of the sample was used to indicate ultimate elongation.

The number of days of heat aging which resulted in rupture of the sample at or below 150% elongation on the Instron was selected as the time to failure.

Various amounts of 2,4,6 tris-(diallylphosphonato)-1,3,5 triazine were added to the Marlex 6003, together with anti-oxidants, the results of which are summarized in Table I.

TABLE 1

| Antioxidant Blend | A | A:B | A:C | A:D | A:E | A:F | A:G | A:H | A:I |
|---|---|---|---|---|---|---|---|---|---|
| Ratio in p.p.h. 0:3 | (3pph) | | | | | | | | |
| Days of Heat Aging to failure | <~6 | ~8 | 13 | 12 | >13 | 7 | 11 | 6 | 11 |
| pph 1:2 | | | | | | | | | |
| Days of Heat Aging to failure | | 13 | 13 | 25 | >25 | 13 | 18 | 13 | 11 |
| pph 2:1 | | | | | | | | | |
| Days of Heat Aging | | >13 | 13 | 21 | >25 | 13 | ~15 | 18 | 11 |

TABLE 1-continued

| Antioxidant Blend | A | A:B | A:C | A:D | A:E | A:F | A:G | A:H | A:I |
|---|---|---|---|---|---|---|---|---|---|
| to failure | | | | | | | | | |

A is 2,4,6-tris-(diallyl phosphonato)-1,3,5-triazine
B is 2,2'-thiobis(4-methyl-6-t-butyl-phenol)
C is tetrakis[3-(3,5-di-t-butyl-4-hydroxy phenyl) propionyloxymethyl] methane
D is 4,4'-thiobis(6-t-butyl-m-cresol)
E is oligomers of 4,4'-thiobis(6-t-butyl-m-cresol) as described in copending application Ser. No. 150,831, "Compositions of Antioxidants of Reduced Volatility".
F is a high molecular weight sulfur containing hindered phenol cyanurate (triazine derivative)
G is 4,4'-thiobis(6-t-butyl-o-cresol)
H is 1,1'-thiobis(2-naphthol)
I is bis[(3,5-di-t-butyl-4-hydroxyphenyl) propionyl-2-oxyethyl] sulfide As can be seen from Table I, the phosphonate alone (antioxidant A) or the hydroxy aromatic compound containing sulfur alone generally failed in less than 13 days at the 3 pph level. However, a 3 pph level of a blend of phosphonates and hydroxy aromatic compound containing sulfur gave substantially better results in the order of 25 days, indicating a synergestic result from the blending of the two ingredients. Also, where a non-sulfur containing phenol (antioxidant C) and a phenol with the sulfur atom not attached to an aromatic group (antioxidant I) were evaluated, little or no increased life was obtained. Finally, where the sulfur atom is attached to an unsaturated heterocyclic compound such as a triazine ring (F), only a slight increase in life was obtained. Thus, it appears that the preferred system is a phosphonate with a hydroxy aromatic compound containing sulfur which has at least one of the sulfur atoms attached to an aromatic ring.

EXAMPLE II

Stauffer E719 from the Stauffer Chemical Company having the formula

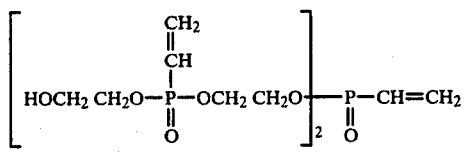

was blended with antioxidant E of Table I and Marlex 6003. Failure was measured as generally described in Example I but the temperature of heat aging was 200° C. and failure was defined as an elongation at or below 50%.

4 pph of antioxidant E alone and a 1:3 ratio of E to E719 gave approximately 100 hours before failure. E719 alone resulted in failure in less than 24 hours. However, a 3:1 ratio of E to E719 gave 148 hours while 2:2 ratio resulted in 138 hours until failure.

EXAMPLE III

A fire retardant plastic of the following formula was used to evaluate antioxidant efficiency.

| Low density polyethylene | 40% |
|---|---|
| Ethylene-ethyl acrylate copolymer | 7% |
| Ethylene-propylene-diene terpolymer | 8% |
| Flame retardant (brominated aromatic) | 21% |
| Antimony oxide | 10% |
| Thermal Stabilizers | 6% |
| Trimethylolpropane trimethylacrylate | 3% |
| Antioxidant Combination | 5% |

An organic phosphonate of the formula di-n-octadecyl-3-t-butyl-4-hydroxy-5-methylbenzyl-phosphonate was blended with other antioxidants, and tested for resistance to oxidation, the results of which are summarized on Table II.

As can be seen from Table II, a synergistic result is obtained with the fire retardant plastic when an organic phosphonate (J) is blended with a sulfur containing substituted phenol. When the phosphonate was blended with a sulfur containing compound not containing a phenolic substituent (K), no synergism was found. Also, when the phosphonate was blended with a hydroxy aromatic compound containing a sulfur group not attached to a ringed compound (I), poorer results were obtained. Also, when a nickel salt of a phosphonate (M) was blended with a hydroxy aromatic compound containing sulfur (E) synergism was much less pronounced than where a metallic salt was not part of the combination, i.e. J:E.

TABLE II

| Antioxidant Blend | | J:E | J:L | J:F | J:I | J:K | E:M | E:N |
|---|---|---|---|---|---|---|---|---|
| Ratio in p.p.h. | 6:0 | | | | | | | |
| Days at 175° C. for failure | | less than 14 days | less than 14 days | | | | 11–14 days | 11–13 days |
| Ratio | 5:1 | | | | | | | |
| Days at 175° C. for failure | | 24 days | | | | | | |
| Ratio | 4:2 | | | | | | | |
| Days at 175° C. for failure | | 27 days | greater than 30 days | 26 days | less than 14 days | less than 12 days | 12 days | |
| Ratio | 3:3 | | | | | | | |
| Days at 175° C. for failure | | 30 days | 23 days | | | | 13 days | 19 days |
| Ratio | 2:4 | | | | | | | |
| Days at 175° C. for failure | | 17 days | 30 days | 16 days | | | | |
| Ratio | 1:5 | | | | | | | |
| Days at 175° C. for failure | | | 16 days | | | | | |
| Ratio | 0:6 | | | | | | | |
| Days at 175° C. for | | | less than | | | | less than | less than |

TABLE II-continued

| Antioxidant Blend | J:E | J:L | J:F | J:I | J:K | E:M | E:N |
|---|---|---|---|---|---|---|---|
| failure | 12 days | 16 days | 15 days | | | 7 days | 7 days |

*A to I are the materials given in Table I.
K is dilauryl dithiopropionate
J is di-n-octadecyl-3-t-butyl-4-hydroxy-5-methylbenzyl phosphonate
L is the reaction product of 3 moles of 4,4'-thiobis(6-A-butyl-(m-cresol) with 1.05 moles of phosphorus oxychloride as described in U.S. Pat. No. 3,354,117.
M-Nickel bis [o-ethyl (3,5-di-t-butyl-4-hydroxybenzyl)]phosphonate
N-Free acid of bis [o-ethyl (3,5-di-t-butyl-4-hydroxybenzyl)]phosphonate

TABLE III

| Parts of J | B | C | D | E | H | F | G | I |
|---|---|---|---|---|---|---|---|---|
| 0 Days at 175° C. for failure | less than 6 days | 7 days | 7 days | about 20 days | about 9 days | about 6 days | about 6 days | 6 days |
| 1 Days at 175° C. for failure | 7 days | 7 days | 12 days | about 24 days | about 9 days | 11 days | 13 days | 8 days |
| 2 Days at 175° C. for failure | 13 days | 11 days | 19 days | about 30 days | greater than 19 days | greater than 16 days | 18 days | 14 days |

EXAMPLE IV

Approximately 12 mil thick strips of Marlex 6003 containing 3 parts total antioxidants was irradiated to 15 Mrads. Various blends of di-n-octadecyl-3-t-butyl-4-hydroxy-5-methylbenzyl phosphonate were evaluated as summarized in Table III. Failure was defined as in Example II. A sample containing 3 parts of J only failed after 13 days.

EXAMPLE V

The experiments of Example IV were generally repeated using diallylallyphosphonate in place of di-n-octadecyl-3-t-butyl-4-hydroxy-5-methylbenzyl phosphonate with similar results.

EXAMPLE VI

The experiments of Example IV were generally repeated using diamylamylphosphonate in place of di-n-octadecyl-3-t-butyl-4-hydroxy-5-methylbenzyl phosphonate with similar results.

I claim:

1. An antioxidant composition suitable for use with polymers subject to oxidative degradation, comprising a mixture of a non-metallic hydroxy aromatic compound having at least one sulfur atom attached to an aromatic carbocyclic ring and an organic phosphonate compound having the general formula

wherein any two or all three of R, R', and R" may be the same or different and may contain further phosphonic moieties and wherein R is independently selected from the group consisting of substituted and unsubstituted alkyl, alkenyl, aryl, aralkyl, alkylaryl and triazine and wherein R' and R" are independently selected from the group consisting of, substituted and unsubstituted alkyl, alkenyl, aryl, alkylaryl, aralkyl and triazine wherein R' and R" can be linked together to form a ring.

2. The composition of claim 1 wherein the sulfur atom containing hydroxy aromatic compound is a compound of the general formula $R_1$—S—$R_2$ wherein $R_1$ and $R_2$ are independently selected from the group consisting of substituted and unsubstituted phenols and naphthols.

3. The composition of claim 1 wherein the hydroxy aromatic compound is 4,4'-thiobis(6-t-butyl-m-cresol).

4. The composition of claim 1 wherein the hydroxy aromatic compound is a mixture of oligomers of 4,4'-thiobis(6-t-butyl-m-cresol).

5. The composition of claim 1 wherein the hydroxy aromatic compound is 4,4'-thiobis(6-t-butyl-o-cresol).

6. The composition of claim 1 wherein the hydroxy aromatic compound is 1,1'-thiobis(2-naphthol).

7. The composition of claim 1 wherein the hydroxy aromatic compound is 2,2'-thiobis(4-methyl-6-t-butyl phenol).

8. The composition of claim 1 wherein the hydroxy aromatic compound is the reaction product of phosphorus oxychloride and 4,4'-thiobis(6-t-butyl-m-cresol).

9. The composition of claim 1 wherein the organic phosphonate is an organic ester of 3-t-butyl-4-hydroxy-5-methylbenzylphosphonate.

10. The composition of claim 9 wherein the organic phosphonate is di-n-octadecyl-3-t-butyl-4-hydroxy-5-methylbenzylphosphonate.

11. The composition of claim 1 wherein the organic phosphonate is a phosphonate ester of the formula

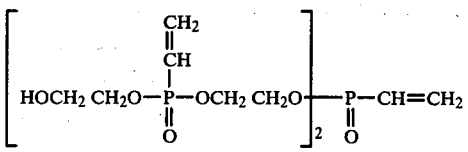

12. The composition of claim 1 wherein the organic phosphonate is a 2,4,6-tris-(dialkyl phosphonato)-1,3,5 triazine.

13. The composition of claim 12 wherein the organic phosphonate is a 2,4,6 tris-(dialkenyl phosphonato)-1,3,5 triazine.

14. The composition of claim 13 wherein the organic phosphonate is 2,4,6 tris-(diallyl phosphonato)-1,3,5 triazine.

15. The composition of claim 1 wherein the organic phosphonate is diamylamylphosphonate.

16. The composition of claim 1 wherein the organic phosphonate is diallylallylphosphonate.

* * * * *